Figure 1:
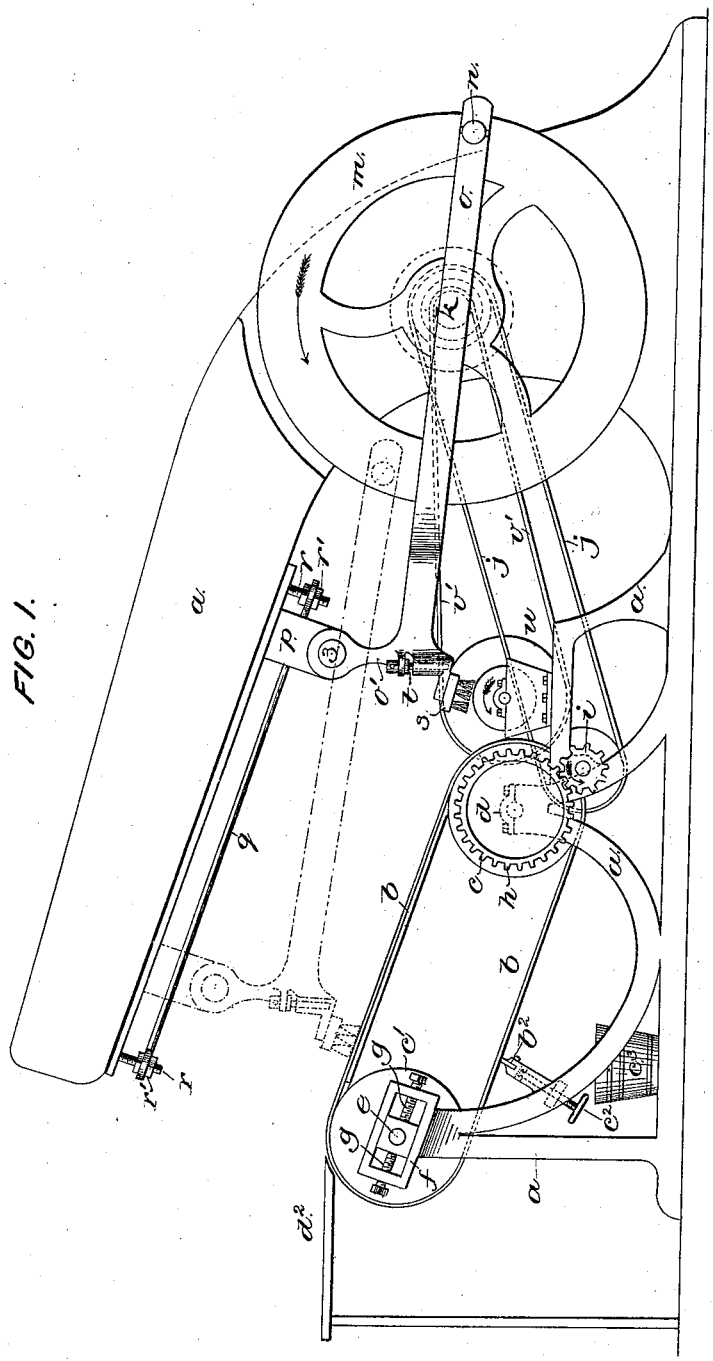

(No Model.)  2 Sheets—Sheet 1.

F. B. BATCHELDER.
LEATHER DRESSING MACHINE.

No. 320,906. Patented June 30, 1885.

Witnesses.
John F. C. Prindiville
Fred A. Powell

Inventor:
Fred B. Batchelder
by Crosby & Gregory.
Attys.

(No Model.) 2 Sheets—Sheet 2.
F. B. BATCHELDER.
LEATHER DRESSING MACHINE.
No. 320,906. Patented June 30, 1885.
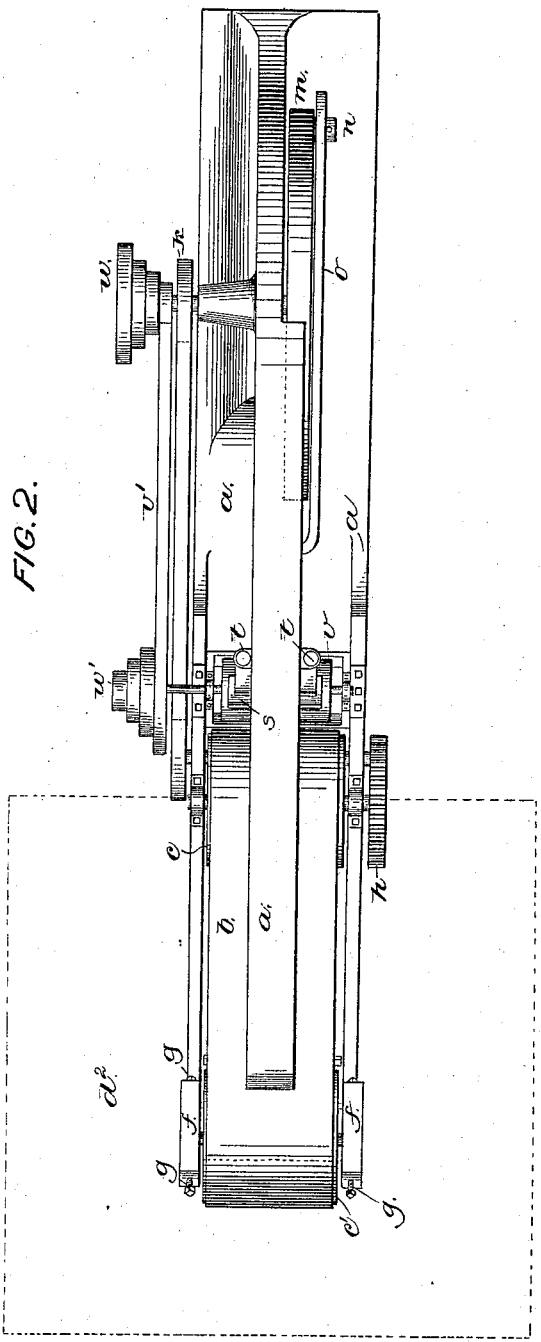

UNITED STATES PATENT OFFICE.

FRED B. BATCHELDER, OF MALDEN, MASSACHUSETTS.

LEATHER-DRESSING MACHINE.

SPECIFICATION forming part of Letters Patent No. 320,906, dated June 30, 1885.

Application filed July 5, 1882. (No model.)

*To all whom it may concern:*

Be it known that I, FRED B. BATCHELDER, of Malden, county of Middlesex, State of Massachusetts, have invented an Improvement in Leather-Dressing Machines, of which the following description, in connection with the accompanying drawings, is a specification.

My invention relates to a leather-dressing machine for applying blacking, paste, stains, or other dressing or mixture to one side of a skin or piece of leather without affecting the other side thereof.

The invention consists, partly, in the combination, with an endless flexible support or traveling table for the leather to be operated upon, of a spreading device for applying the dressing; also, in the combination, with the support for the leather and the spreading device for applying the dressing, of a tank or vat to contain the dressing, and a feeding device by which it is transferred in the proper quantities to the said spreading device; also, in the combination, with an endless flexible traveling support, of a spreading device for the dressing, and a scraping or cleaning device, whereby the surplus dressing is removed from the traveling surface after it has passed the point at which the dressing is applied, and before it arrives again beneath the new piece of leather being dressed.

The invention further consists in details of construction, as hereinafter more fully described.

The spreading device consists of a brush or swab actuated with a reciprocating movement above the traveling support for the leather, the said brush being connected with a carriage or cross-head traveling on suitable guides and actuated by a pitman or connecting-rod, with a crank-pin mounted upon a wheel, so arranged with relation to the leather-supporting surface that the said brush makes its stroke in one direction in contact with the said surface, but in making its return-stroke is raised therefrom.

The guides for the carriage for the spreading device are made adjustable with relation to the leather-supporting surface, and the spreading device is adjustably connected with the pitman in such a manner that the said spreading device may be caused to act with any desired pressure upon the traveling surface or leather thereon.

The dressing-mixture is contained in a tank located beneath the point at which the spreading device pauses at the end of its stroke, and the dressing material is fed from the said tank to the spreading device by a feeding-roller dipping in the said dressing in the tank, and having its upper surface in contact with the spreading device when at the end of its stroke.

The amount of dressing material that is transferred from the tank to the spreading device will depend upon the speed of rotation of the feeding-roller, which may be varied as desired.

Figure 1 represents, in side elevation, a leather-dressing machine embodying this invention, and Fig. 2 a top view thereof.

The frame-work $a$ is of suitable form to sustain the working parts. The flexible traveling leather-supporting surface or endless table $b$, composed of sheet brass, steel, or other suitable material or fabric, is stretched over the drums $c$ $c'$, the former having a fixed bearing at $d$ upon the frame-work, and the latter having its bearing in a box, $e$, arranged to slide in a suitable guide, $f$, in the frame-work, and having its position adjusted therein by means of screws $g$, to give the flexible table $b$ the proper tension. The shaft of the drum $c$ is provided with a gear, $h$, meshing with a pinion, $i$, actuated by a belt, $j$, carried by a pulley on the main driven shaft $k$ of the machine. The said shaft $k$ carries a wheel, $m$, having a crank or wrist pin, $n$, connected with one end of a pitman or connecting-rod, $o$, having at its other end a laterally-projecting arm, $o'$, pivoted at 3 to a carriage or cross-head, $p$, mounted to reciprocate upon a guide, $q$, substantially parallel with the endless table, and adjustably connected with an arm of the frame-work $a$ by the bolts or threaded studs $r$ and nuts $r'$ thereon, by means of which the said carriage $p$ may be caused to travel in a path more or less remote from the leather-supporting surface $b$, as may be desired. The pitman $o$ carries the spreading device, shown as a brush, $s$, adjustably connected therewith by screws $t$, and readily detachable, so as to enable various kinds of spreading devices, such as swabs, brushes, and so forth, to be employed at different times, according to the nature of the material being applied to the leather.

Owing to the distance of the spreading device $s$ from the pivotal connecting-point 3 of the pitman $o$ with the carriage $p$, and to the fact that the other end of the said pitman connected with the pin moves in a circular path, it will be seen that the brush $s$, in addition to its reciprocating movement with the carriage $p$, also has a rocking or oscillating movement relative to the point 3, the said rocking movement being greatest when the spreading device is at the ends of its stroke, or, in other words, when the pin $n$ is passing the center, as shown in Fig. 1.

The axis of the wheel $m$ is placed a considerable distance above the plane of the leather-supporting surface $b$, if continued, so that while the pin $n$ is passing through the lower portion of its path and the spreading device making its stroke from the upper to the lower end of the leather-supporting surface $b$, the line from the point 3 through the said device $s$ is nearly at right angles to the guide $q$, so that the device $s$ is at its greatest distance from the said guide, and is pressed as closely as possible to the surface $b$.

When, however, the pin is moving through the upper portion of its path, the line from the pivot 3 to the device $s$ is considerably inclined to the guide $q$, so that the said device $s$ is lifted from the surface $b$ during its return-stroke. The dressing material is contained in a vat or tank, $u$, near the lower end of the traveling surface $b$, and beneath the point where the spreading device pauses at the end of its stroke, as shown in full lines, Fig. 1.

A feeding device, $v$, shown as a roller dipping in the material in the vat $u$, and actuated at the desired speed by a belt, $v'$, passing over cones of pulleys $w\ w'$ upon the main shaft of the feed-roller $v$, respectively, transfers the material from the vat $u$ to the device $s$, which, when at the end of its stroke, is in contact with the upper surface of the roller $v$. The amount of material transferred to the device $s$ and thence to the surface of the leather depends upon the speed of rotation of the roller $v$, which may be varied by shifting the belt $v'$ from one to the other of cone of pulleys $w\ w'$ in the well-known manner.

A cleaning device, $b^2$, consisting of a blade or scraper of any suitable material, preferably of rubber, acts upon the lower portion of the traveling leather-supporting surface $b$, to remove the dressing material which may have been placed thereon in the operation of applying it to the leather. The said cleaning device is mounted on the frame-work $a$, and may be adjustable toward the traveling surface $b$ by screws $c^2$, so as to bear against it with any desired pressure, and the material removed into a receptacle, $c^3$, placed beneath the said cleaning device to receive it. The leather-supporting surface or the endless traveling table $b$ is thus kept clean at the point where it passes over the drum $c'$, to receive the leather, so that the under surface of the said leather will not be stained by the dressing material, which might otherwise remain on the said leather-supporting surface.

A stationary table, $d^2$, surrounds the traveling table $b$, for the convenience of the operator handling the leather, who moves the leather about beneath the spreading device, to cause the latter to act upon all parts of its upper surface.

I claim—

1. In a leather-finishing machine, a traveling flexible leather-supporting surface or endless table, combined with a spreading device and actuating mechanism, whereby it is caused to reciprocate or travel forth and back over the endless table, substantially as set forth.

2. In a leather-finishing machine, a traveling flexible leather-supporting surface or endless table, a tank to contain the dressing material, and a rotating feeding device or feed-roller in contact with or partly submerged in the dressing material in said tank, combined with a spreading device and actuating mechism, whereby said spreading device is caused to travel forth and back over the endless table, and to be alternately brought in contact with the feed-roller and the leather on the endless table, to convey dressing material from the former to the latter, substantially as described.

3. The flexible traveling leather-supporting surface or endless table, combined with a dressing-spreading device and a cleaning device for removing the dressing from the said endless table, substantially as described.

4. The leather-supporting surface, combined with the dressing-spreading device, its actuating-pitman, and sliding carriage or cross-head at one end and actuating-crank at the other end of the said pitman, arranged as described, whereby the said spreading device has a reciprocating and oscillating movement, substantially as and for the purpose described.

5. The leather-supporting surface or table and spreading device having a reciprocating motion over the said table, combined with a tank to contain the dressing material, and a feeding device, whereby the said material is conveyed from the said tank to the said spreading device, substantially as described.

In testimony whereof I have signed my name to this specification in the presence of two subscribing witnesses.

FRED B. BATCHELDER.

Witnesses:
JOS. P. LIVERMORE,
W. H. SIGSTON.